United States Patent [19]

Becker et al.

[11] 4,251,253
[45] Feb. 17, 1981

[54] COOLING SYSTEM FOR MOLDS

[75] Inventors: Kurt Becker, Obernkirchen; Lothar Schaar, Heuerssen, both of Fed. Rep. of Germany

[73] Assignee: Hermann Heye, Obernkirchen, Fed. Rep. of Germany

[21] Appl. No.: 89,903

[22] Filed: Oct. 30, 1979

Related U.S. Application Data

[63] Continuation of Ser. No. 883,137, Mar. 3, 1978, abandoned, which is a continuation of Ser. No. 715,434, Aug. 18, 1976, abandoned.

[30] Foreign Application Priority Data

Aug. 20, 1975 [DE] Fed. Rep. of Germany ....... 2537037

[51] Int. Cl.³ .................................... C03B 9/38
[52] U.S. Cl. ......................... 65/267; 65/319; 65/356
[58] Field of Search ................. 65/355, 356, 173, 319, 65/265, 267

[56] References Cited

U.S. PATENT DOCUMENTS

| 1,798,136 | 3/1931 | Barker ................. 65/355 X |
| 1,875,202 | 8/1932 | Aftergut ............... 65/356 X |
| 2,508,891 | 5/1950 | Rowe .................. 65/356 X |
| 2,751,715 | 6/1956 | Denman ................ 65/319 |
| 3,024,571 | 3/1962 | Abbott et al. ......... 65/356 X |
| 3,027,685 | 4/1962 | Cooke .................. 65/356 |
| 3,314,775 | 4/1967 | Shelter et al. ......... 65/173 X |
| 3,376,123 | 4/1968 | Leeuw .................. 65/356 X |
| 3,499,746 | 3/1970 | Blankenship et al. ... 65/356 X |
| 3,653,870 | 4/1972 | Foster et al. .......... 65/319 |
| 3,731,650 | 5/1973 | Schweikert et al. .... 65/356 X |
| 3,763,293 | 10/1973 | Nussbaum ............ 425/243 X |
| 3,810,747 | 5/1974 | Bork .................... 65/356 X |
| 3,834,205 | 9/1974 | Maag et al. ........... 65/356 X |
| 3,888,647 | 6/1975 | Breeden ............... 65/319 X |
| 3,997,318 | 12/1976 | Takatoki et al. ...... 65/356 X |

Primary Examiner—Arthur D. Kellogg
Attorney, Agent, or Firm—Michael J. Striker

[57] ABSTRACT

A mold has a mold cavity centered on an axis and formed with a plurality of arrays of passages each lying at least approximately in a respective plane including the mold axis. Fluid is passed through these passages in order to cool the mold, and fluid may be passed more rapidly or under greater pressure or under lower temperature through some of the passages than through others in order to increase the cooling effect. Similarly inserts may partially insulate some of the passages for cooling some parts of the mold more or less than others. A plurality of temperature sensors each connected to a respective control valve may serve to control the fluid flow through each of the passages or sets of passages for continuous cooling control.

12 Claims, 19 Drawing Figures

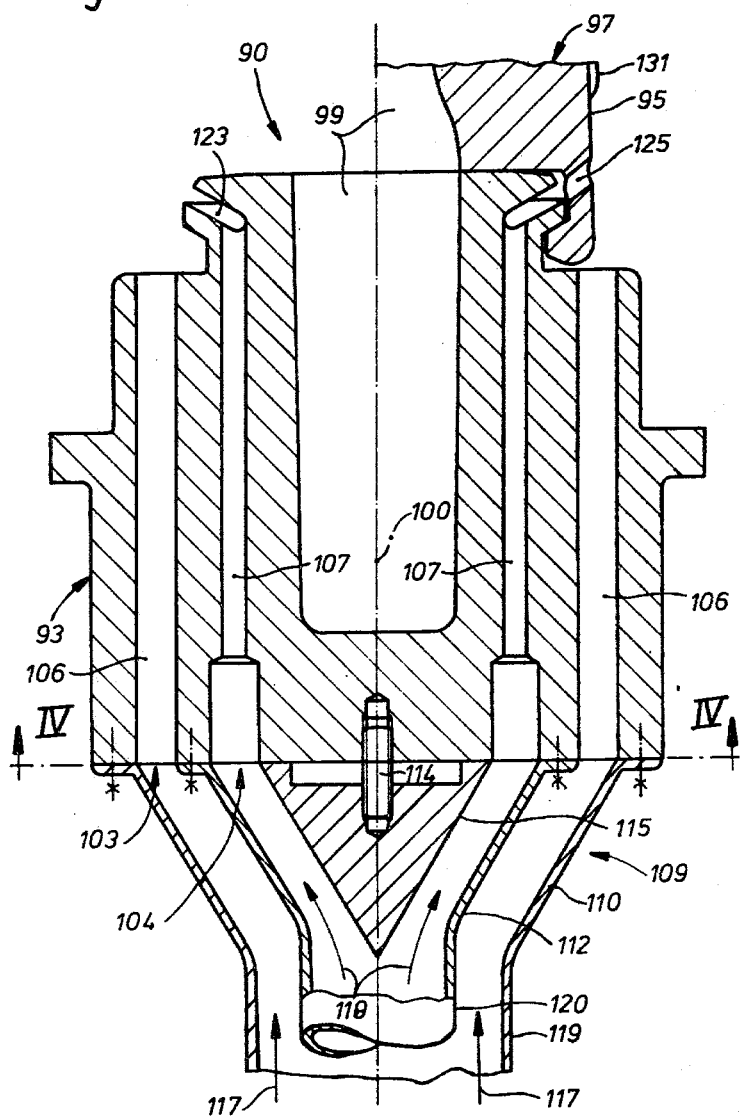

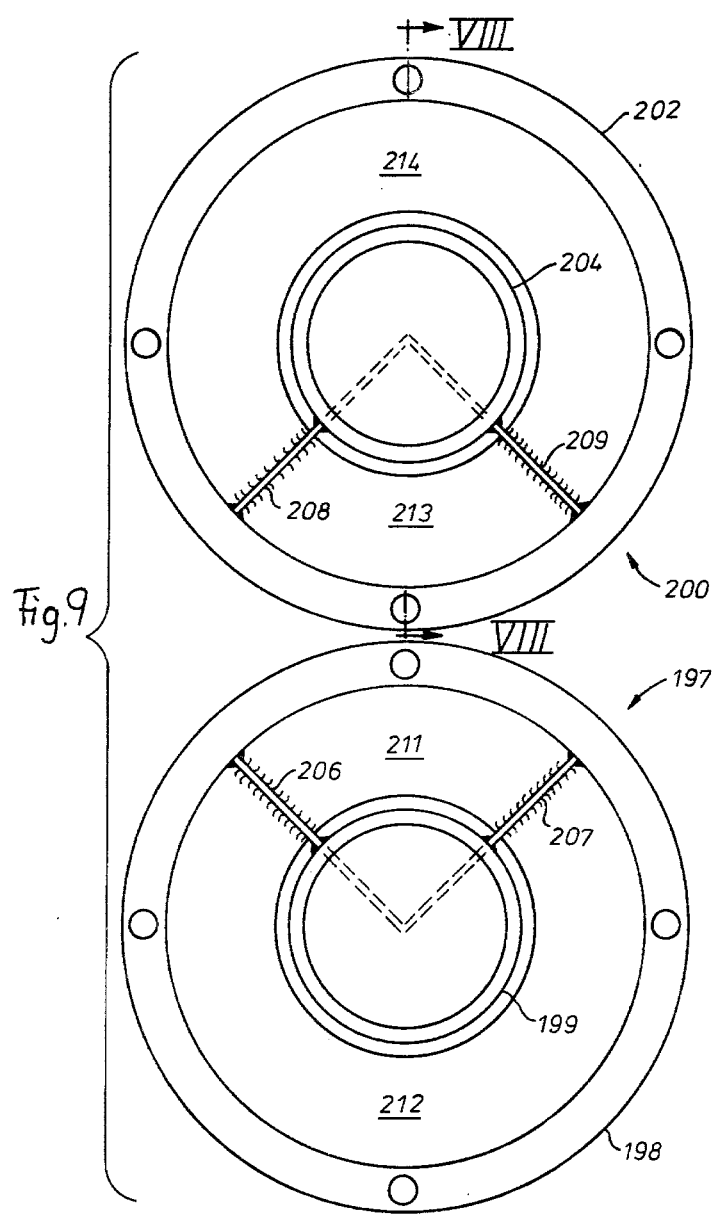

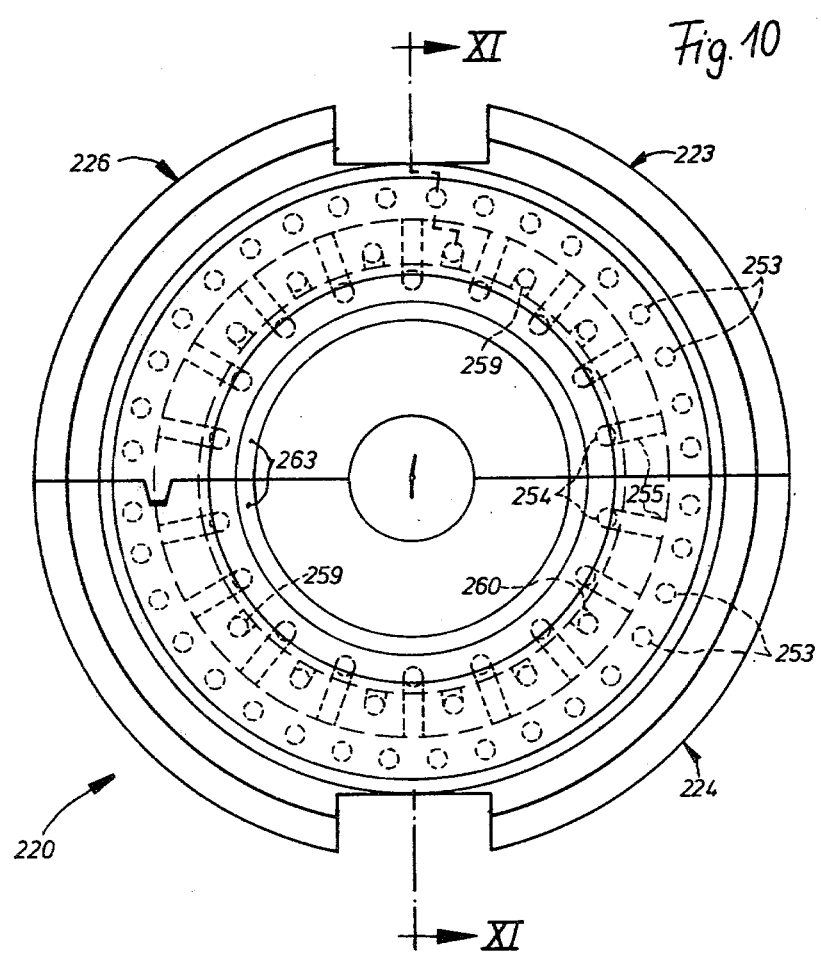

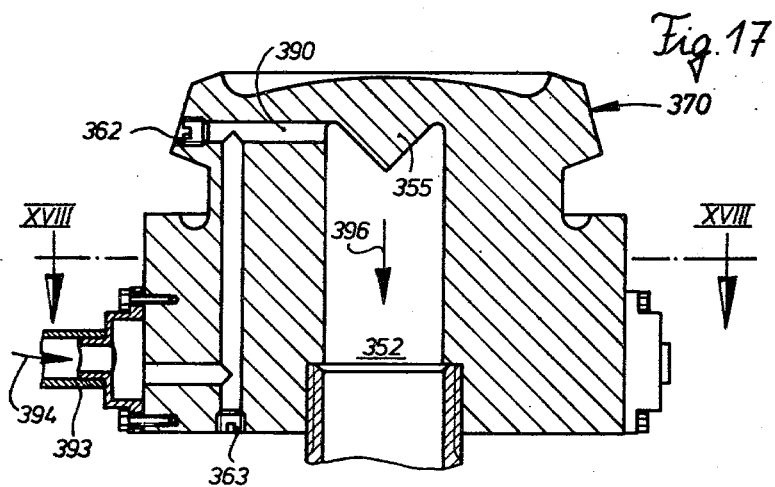
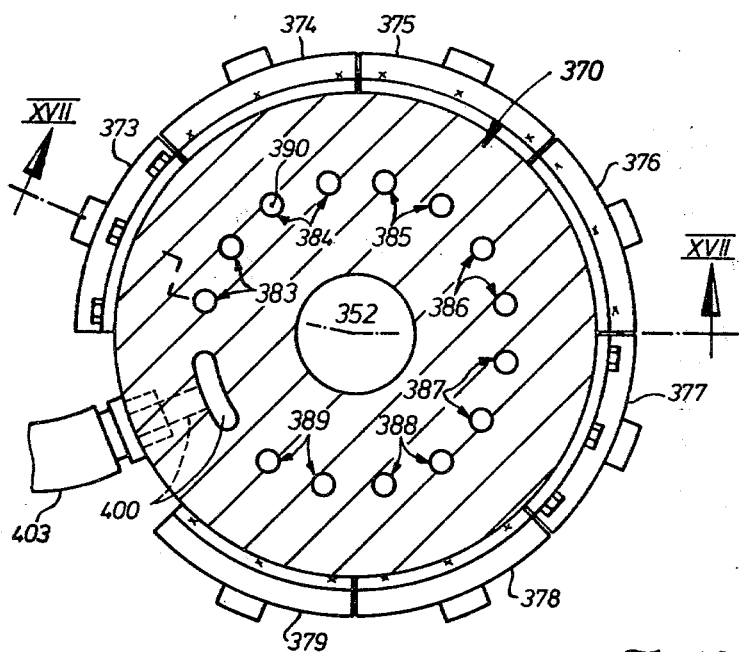

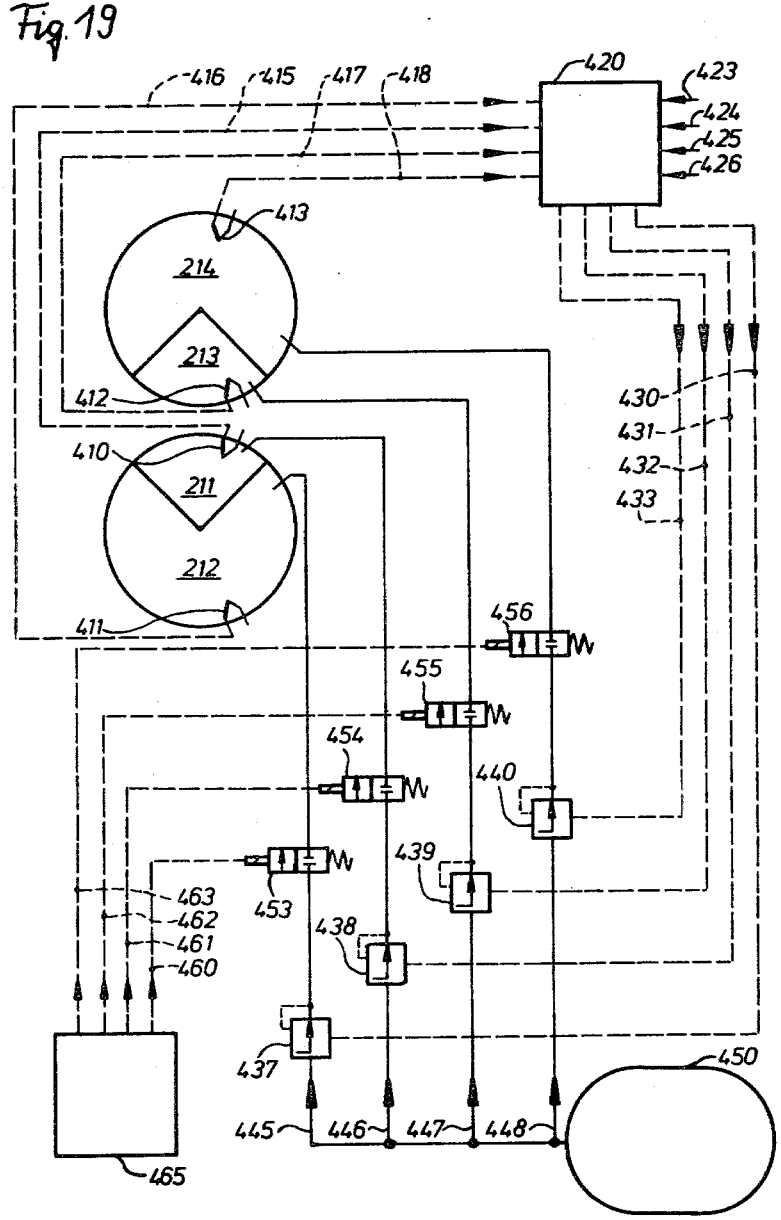

COOLING SYSTEM FOR MOLDS

This is a continuation, of application Ser. No. 883,137, filed Mar. 3, 1978, which in turn is a continuation of application Ser. No. 715,438, filed Aug. 18, 1976, both now abandoned.

BACKGROUND OF THE INVENTION

This invention relates to a method of and apparatus for molding. More particularly this invention concerns a mold assembly such as is used in the production of glass vessels and the like.

In the production of glass vessels and the like it is common practice to form a gob of glass in molten plastically deformable condition into a parison by means of a so-called preform mold. Thereafter this parison is blow-molded into the finished product in a different finish mold. Since the molten gob of glass or the parison has an extremely high temperature, often in the neighborhood of 200° C., it is necessary to cool the molds used for their formation actively. This means that simple heat dissipation into the ambient surroundings is inadequate adequately to cool the mold and achieve any economically justifiable production speed.

Thus, it is necessary to cool the mold typically by passing a cool fluid over the mold. Arrangements have been suggested for passing water and atomized water in air over the mold, as well as simply by forcing air under pressure through passages in the mold. Such systems are frequently relatively complex so that the bulk added to the mold is considerable. In high-speed installations such arrangements are extremely disadvantageous as the rapid opening and closing of the mold is greatly slowed by the considerable bulk of heavy cooling equipment carried by the mold. Furthermore, when a multipart mold is used the complexities increase greatly.

Another disadvantage of the known cooling systems is that it is very difficult to control the cooling in particular regions of the mold. Particularly when non-round objects are being shaped in the mold is it necessary to insure that all of the portions of the object cool at a differentiated rate in order to prevent uncontrolled wall thickness and/or cracking of the workpiece.

It has been suggested to set up the mold for individual cooling of portions. This arrangement has never worked in practice and has added enormous complexities to the molding system. Furthermore, the known systems invariably are set up in accordance with theoretical computations made according to the mold dimensions, so that any other factors which subsequently show themselves to be of greater or lesser importance cannot be compensated out without complete rebuilding of the system.

Another known disadvantage of the systems in use is that the coolant is frequently directed from outside against the mold in order to cool it. Not only does this external equipment increase the size of the installation, but the noise generated by such a system is invariably very great. In fact such systems frequently are the noisiest part of the whole production process. Furthermore, when a liquid coolant is used in such a manner the high humidity levels created by the boiling-off of the liquid causes associated equipment to rust and disintegrate at a great rate. In addition, such external spraying of coolant is inherently messy.

Prior-art mold arrangements can be seen in U.S. Pat. No. 1,798,136 and in British Pat. No. 1,337,292.

SUMMARY OF THE INVENTION

It is therefore an object of the present invention to provide an improved mold arrangement and method of cooling a mold.

Another object is the provision of an improved mold arrangement which is relatively compact, yet which allows the temperature of the mold to be closely controlled.

Yet another object is to provide an improved mold-cooling method which is capable of responding to varying circumstances during production of a molded article.

These objects are attained according to the present invention in a mold arrangement wherein the mold itself is formed with a plurality of throughgoing passages each lying at least approximately in a plane including the axis on which the mold cavity is centered. According to this invention separate streams of fluid are passed through separate ones of these passages in order to achieve a closely controlled cooling of the mold. Thus it is possible to vary the cooling of the mold circumferentially relative to the axis so that the mold may be cooled more or less to one side of the axis than to the other. According to this invention the passages are constituted as bores which extend parallel to the center axis of the mold cavity and/or parallel to the side walls of the mold cavity, but always lying at least approximately in respective planes including the longitudinal axis of the mold cavity.

Although the mold cavity is normally relatively evenly shaped, the rest of the mold frequently is provided with mounting lugs and various structure that gives it considerable mass in some portions and a great deal less in others. Thus it is possible with this invention to increase the cooling effect in the more massive portions and decrease in the thinner portions in order to achieve a regular cooling throughout. Thus when a mold is made of cast iron GG-20 as described in German Standard DIN-17006 it is possible to obtain excellent heat transfer between the workpiece and the mold. It is also possible to use industrial valve-type bronze with very good results. Such arrangements insure excellent conduction of the heat away from the workpiece so that extremely high-quality glass items can be produced.

The system according to the present invention achieves a much greater heat-transfer coefficient between the fluid streams passing through the mold and the mold than has hitherto been possible. Furthermore such an internal cooling arrangement reduces the noise created by this system greatly. Thus if a relatively low pressure of, for example, 500 mm water column is used it is possible to achieve results only obtainable hitherto with much greater pressures produced, therefore, by much more expensive and complicated equipment.

The mold according to this invention is preferably used for the production of glass or vitreous objects. The old may have a split neck ring supporting an unsplit one-piece guide ring. A preforming portion may be split or of the block type and may be secured by means of a split ring to the neck ring, or via an intermediate or center piece to this neck ring. In addition the neck ring can work together with a finishing mold comprising a pair of interfitting wall portions and a separate bottom or base. In accordance with this invention the various passages formed through such split parts all work together when the arrangement is closed or assembled in order to achieve most efficient cooling.

The system according to the present invention is extremely advantageous when combined with split molds, as the split invariably falls along the above-mentioned axis of the mold. Thus, even when the mold is opened or disassembled it is possible for coolant to flow through the various parts. With the system according to this invention it has been found that the quantity of coolant, usually air, needed to cool a given workpiece can be reduced by up to 90%. Furthermore, the noise level can be reduced to less than 90 dB$_A$, compared to a typical noise level of 110 dB$_A$, in prior-art external-blowing arrangements.

In accordance with this invention different cooling effects are achieved by the different fluid streams by changing the heat-transfer function of these streams. This can be varied by increasing the flow rate of one stream relative to another or increasing the pressure of one stream relative to another so as to achieve greater heat exchange. Furthermore, it is possible to use a fluid having a greater heat capacity in one stream than in another in order to maximize cooling effect.

According to yet another feature of this invention temperature sensors are provided around the mold to be cooled and are connected to the various fluid supplies via a control arrangement so that the temperature in each sector of the mold can be varied independently of the temperature in the other sectors. Thus, it is possible to achieve an exactly controlled heat distribution within a given mold, even allowing for the various changes in heat distribution due to production irregularities. Thus a fully responsive system may be produced.

According to yet another feature of this invention at least some of the holes are provided with tubular inserts that extend at least partly axially along the respective passages. These inserts are spaced from the inner wall of the respective passages and/or are made of insulating material so as to reduce the heat-exchange effect between the respective fluid stream and the passage. Thus, it is possible exactly to tailor the distribution in the arrangement and, therefore, exactly control the heat exchange in various sectors of the mold. This arrangement is particularly useful in multiple mold systems wherein a plurality of molds are mounted on the same carrying arrangement, as frequently those portions of adjacent molds turned towards each other are much hotter than the other portions of these molds. It is possible right on the site to take temperature measurements of the mold and change the cooling effect by simply pulling off the air-feed manifold and fitting the necessary tubes to these passages in areas that are excessively cool. It is further within the scope of this invention to form these inserts with radially throughgoing holes, and to either side of these holes with seals so that particular regions of the interior of the respective passage can be exposed to the cooling fluid whereas others are not. This therefore makes it possible very finely to regulate the cooling within various portions of the mold.

In accordance with yet another feature of this invention the passages are provided in at least one annular array surrounding the mold cavity. Manifolds are connected to the one ends of these passages, with deflectors provided inside the manifolds to separate off at least a sector of such an annular array and allow it to be cooled at a different rate from the remaining passages. It is possible to provide a groove into which all of the passages open at their downstream ends. Feed devices are connected over a plurality of the passages at this groove and may be connected with hoses to feed arrangements for separate control of the sectors comprised by each group of passages connected to the same feed device.

According to another feature of this invention the mold is comprised of at least two parts which abut along these parting surfaces. At least some of the passages open at these surfaces so that only when the mold is open or disassembled is it possible for fluid to flow through these passages. Such an arrangement allows the mold parts to be cooled at a much greater rate once they are split apart than when they are together, as is necessary in many glass-making operations.

According to yet another feature of the present invention the bottom of the mold cavity is formed by a separate base element of the mold itself formed with a central recess on its side turned away from the mold cavity and with a plurality of radially extending bores or passages opening into this recess. It is thus possible with this base part to control the cooling of various sectors of the base individually or jointly in order accurately to control the cooling of the base part of the workpiece.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a longitudinal section taken through a second embodiment of a mold in accordance with this invention;

FIG. 9 is a section taken along line IX—IX of FIG. 8;

FIG. 10 is a fourth embodiment of the present invention seen in a bottom view with a portion of the mold removed;

FIG. 17 is a view corresponding to FIG. 15 of another base part in accordance with this invention;

FIG. 18 is a section taken along line XVIII—XVIII of FIG. 17, section line XVII—XVII of FIG. 18 corresponding to FIG. 17; and FIG. 19 is a schematic view of a control system useable with the arrangement of FIGS. 7–9.

SPECIFIC DESCRIPTION OF PREFERRED EMBODIMENTS

Figure 1:
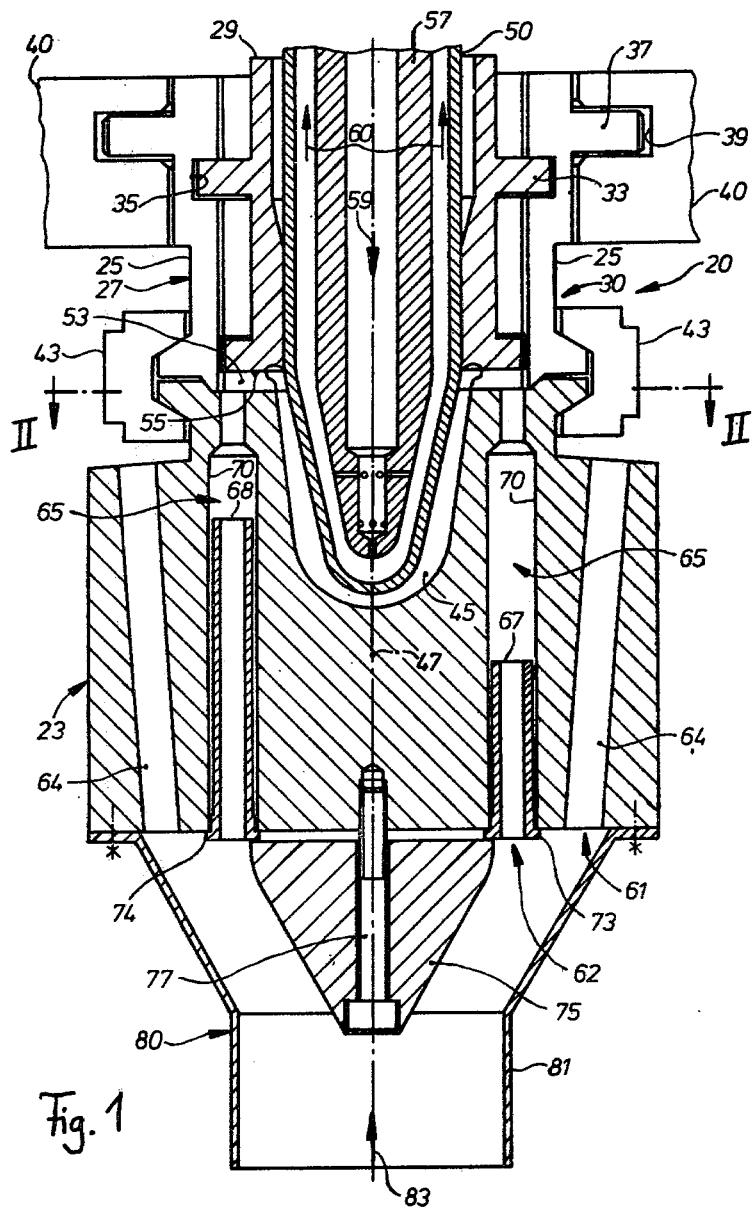
FIG. 1 is a longitudinal section through a first embodiment of a mold according to this invention.
Figure 2:
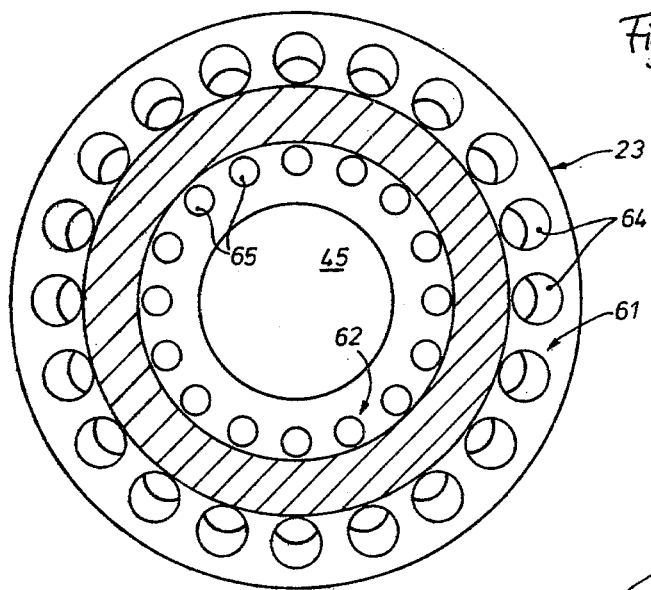
FIG. 2 is a section taken along line II—II of FIG. 1.

The first embodiment of the invention shown in FIGS. 1 and 2, comprises a mold 20 formed with a one-piece preshaper 23 and having a pair of neck ring halves 26 forming a split neck ring 27 and an unsplit guide ring 29. The neck ring 27 and ring 29 together form a neck mold 30. The guide ring 29 has an outwardly extending flange 33 receives in recesses 35 formed in the element 27. Each neck ring half is supported by means of a flange 37 formed on the half 25 that fits in a corresponding annular recess or groove 39 formed on a neck ring holder half 40. When the mold 20 is shut the preshaper 23 is held to the neck ring 27 by means of semi-circular grooved clamping ring halves 43 which are in turn carried on a clamping arrangement that is not shown.

The preshaper 23 is formed with a mold cavity 45 having a central axis 47 and in which is engageable a plunger 50 vertically displaceable through the guide ring 29. The neck ring halves 25 have flanges 53 which engage between a lower surface 55 of the guide ring 29 and the upper surface of the preshaper 23 when the mold is closed. The plunger has a core 57 down through the center of which a coolant such as cool air can be passed in a direction of arrow 59 and upwardly around which this air may exit as shown by arrows 60 in order to cool this plunger 50.

The preshaper mold 23 is formed according to this invention with an outer array 61 of throughgoing passages 64 and an inner array 62 of throughgoing passages 65. The passages 64 lie radially outside passages 65 and are inclined to the axis 47. The passages 65 lie on a cylinder centered on the axis 57 and are, therefore, parallel to this axis 47. When the mold arrangement is closed as shown in FIG. 1 the upper ends of the holes 65 are closed off by the flanges 53. In addition there are provided in the holes 65 inserts 67 and 68 spaced from the inner walls of these holes or passages 65 and serving to limit the heat exchange between a cooling fluid passing upwardly through these passages 65 and the preshaper 23. These inserts 67 and 68 have flanges 73 and 74 gripped between a guide cone 75 and the lower wall of the preshaper 23. To this end a screw 77 holds the guide cone 75 in place.

A manifold 80 is provided which reaches around the cone 75 and is connected to a source for feeding air in a direction 83 to these passages 64 and 65. This manifold 80 has a feed tube 81 and is made of sheet metal. It can readily be removed for access to the screw 77 so that the inserts 67 and 68 which are of different length can be changed.

Air is blown continuously through the holes 64, but only can pass through the holes 65 when the mold is open. This insures excellent cooling of the mold, in a control fashion as determined by the inserts 67 and 68.

The arrangement of FIGS. 3–6 has a mold 90 having a block-type unsplit mold part 93 adapted to cooperate with the halves 95 of a split mold center piece 97 and having a mold cavity 99 centered on an axis 100. This arrangement completed by a week mold (not shown) serves, like the arrangements of FIGS. 1 and 2, for the production of a parison which later may be formed by blow-molding into a finished bottle or the like.

The preshaper 93 here is formed with an outer array 103 and inner array 104 of holes 106 and 107, respectively. These holes 106 and 107 extend parallel to the axis 100.

The lower side of the preshaper 93 carries a manifold arrangement 109 comprising an outer tube 110, and an inner tube 112, and a guide cone 115 held in place by means of a stud 114. Air to cool the assembly is fed to the manifold arrangement 109 so as to flow to the passages 106 as indicated by the arrows 117 and into the passages 107 as indicated by arrows 118. Tubes 119 and 120 are connected to the tubes 110 and 112 and pass concentrically to a pair of compressors or the like.

The passages 106 open at their upper ends to the atmosphere, but the passages 107 open at an upwardly and outwardly directed groove 123 formed at the upper end of the preshaper 93. A multiplicity of radially extending passages or throughgoing holes 125 formed in the center piece halves 95 allow air to flow through the passages 107 even when the assembly is closed as indicated in FIG. 3.

Figure 4:
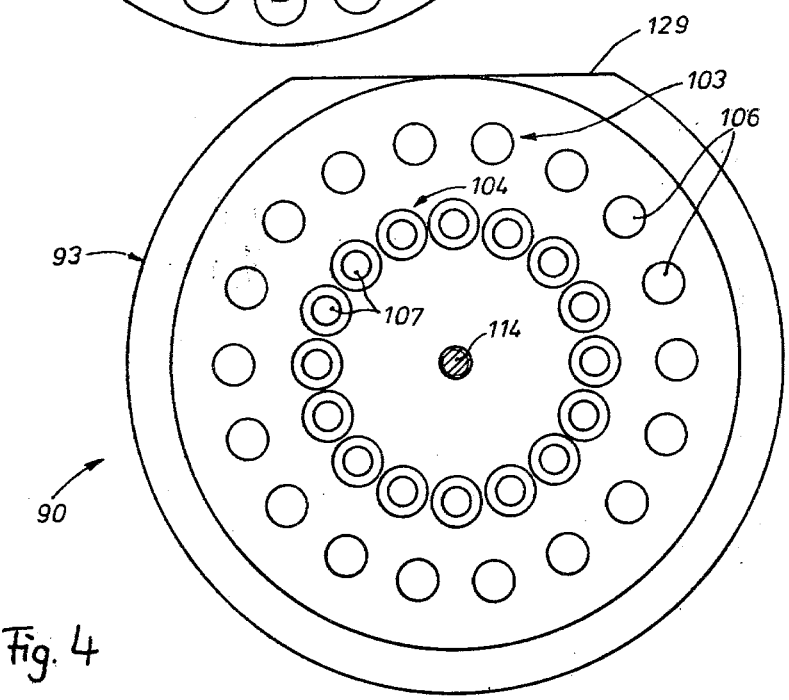
FIG. 4 is a section taken along line IV—IV of FIG. 3.
Figure 6:
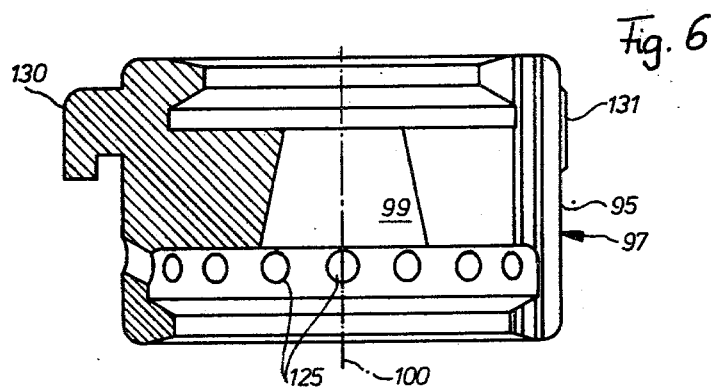
FIG. 6 is a section taken along line VI—VI of FIG. 5.
Figure 5:
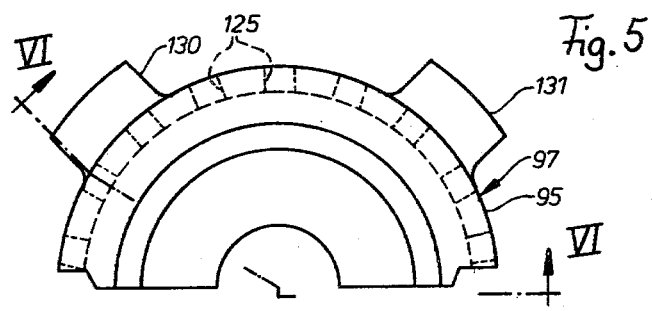
FIG. 5 is a top view of a portion of the apparatus of FIG. 3.

FIG. 4 shows how the arrangement is formed with a flat 129 allowing two of the mold assemblies to be mounted one right next to the other. Furthermore, radial extensions 130, 131 (FIG. 5 and 6) of each half 95 allow it to be carried on a conventional opening and closing arrangement.

Figure 7:
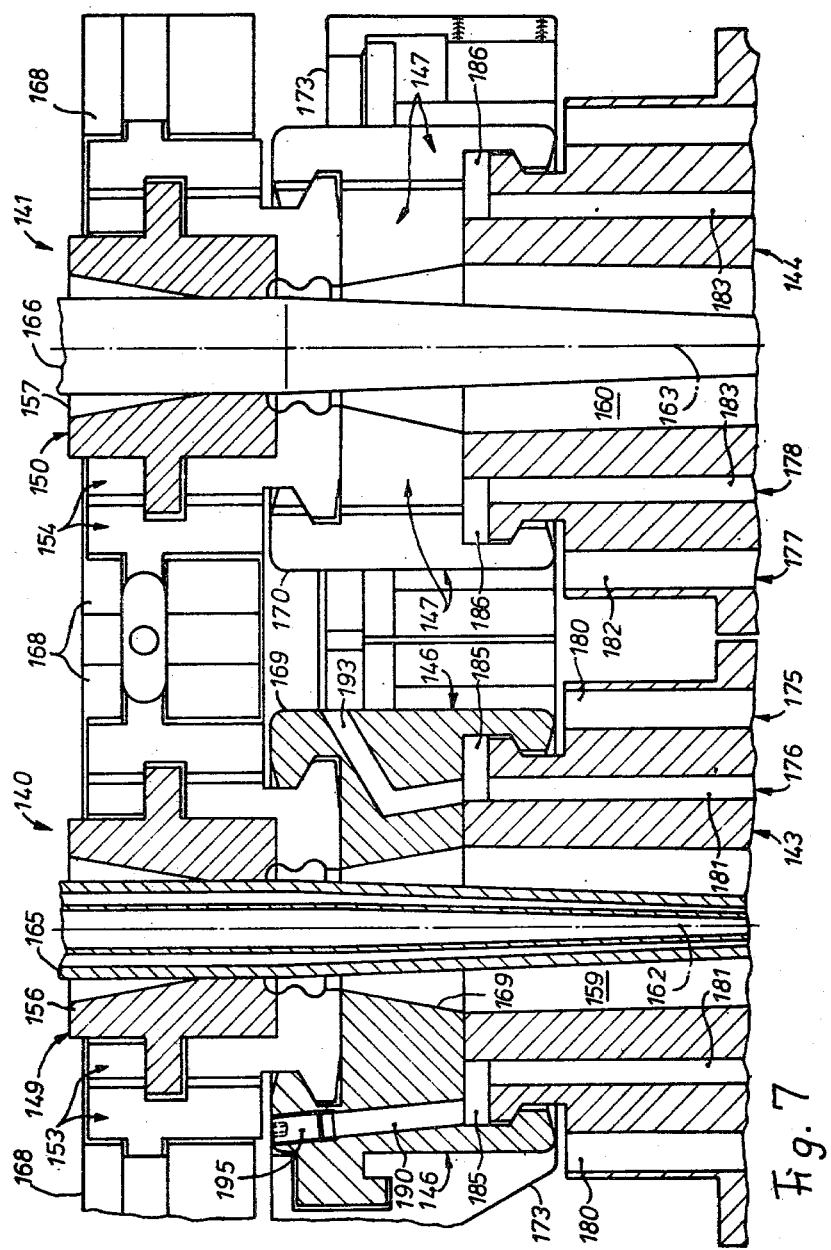
FIG. 7 is a longitudinal section taken through a third embodiment of the mold according to this invention.

FIG. 7 shows a pair of molds 140 and 141 connected together in tandem and comprised by unsplit block-type preshapers 143 and 144, split center pieces 146 and 147, and neck molds 149 and 150 with split neck rings 153 and 154 and hanging thereon unsplit guide rings 156 and 157. The molds 140 and 141 have mold cavities 159 and 160 with axes 162 and 163 along which are displaceable plungers 163 and 166. The two neck rings 153 and 154 each hang half in a holder half 168. Similarly, each of centre piece halves 169 and 170 of the center pieces 146 and 147 hangs in an common closing arrangement or tong half arrangement 173.

The preshapers 143 and 144 are each formed with two groups 175, 176 and 177, 178 of passages 180, 181, and 182, 183 upwardly through each of which passes a coolant such as air. The passages 180 and 182 always open at their upper ends into the atmosphere. The passages 181 and 183 open at their upper outlet ends into respective grooves 185 and 186.

As shown to the left in FIG. 7, where the section plane is different from the right-hand side of FIG. 7, passages 190 are formed in the center piece 146. These passages 190 extend at an angle to the axis 162 upwardly from the groove 185 to an upper end where they may open at the atmosphere or may be blocked by means of plug-screws 195. It is also possible to form passages 193 in this center piece 146, the passages 193 opening downwardly into the groove 185, but then extending outwardly to open at a side rather than a top surface of the center piece 146. It is possible to provide only the passages 190, only the passages 193, or both such types of passages. Furthermore, some or all of any of these bores may be provided with plugs 195 in order to affect fluid distribution.

Figure 8:
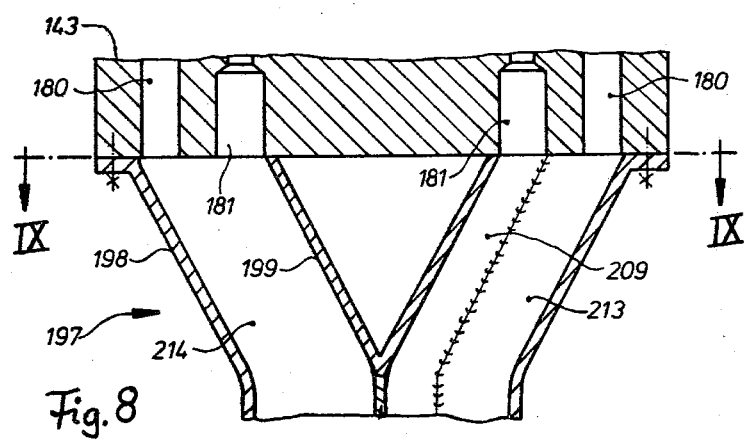
FIG. 8 is a longitudinal section through a detail of the third embodiment not visible in FIG. 7.

FIGS. 8 and 9 show a pair of manifold arrangements 197 and 200 for the molds 140 and 141, respectively. These manifold arrangements 197 and 200 comprise outer tubes 198 and 202 and inner tubes 199 and 204 subdivided by radial partitions 206, 207 and 208, 209 into large sectors or segments 202 and 204 and small segments 211 and 213. The small segments 211 and 213 are facing each other and are fed fluid at a faster rate and/or with lower temperature than the outer segments 212 and 214 to effect greater cooling in these regions where the molds 140 and 141 are closest to each other, as typically in this region the heat loss to the atmosphere is minimal so that greater cooling is required.

Figure 11:
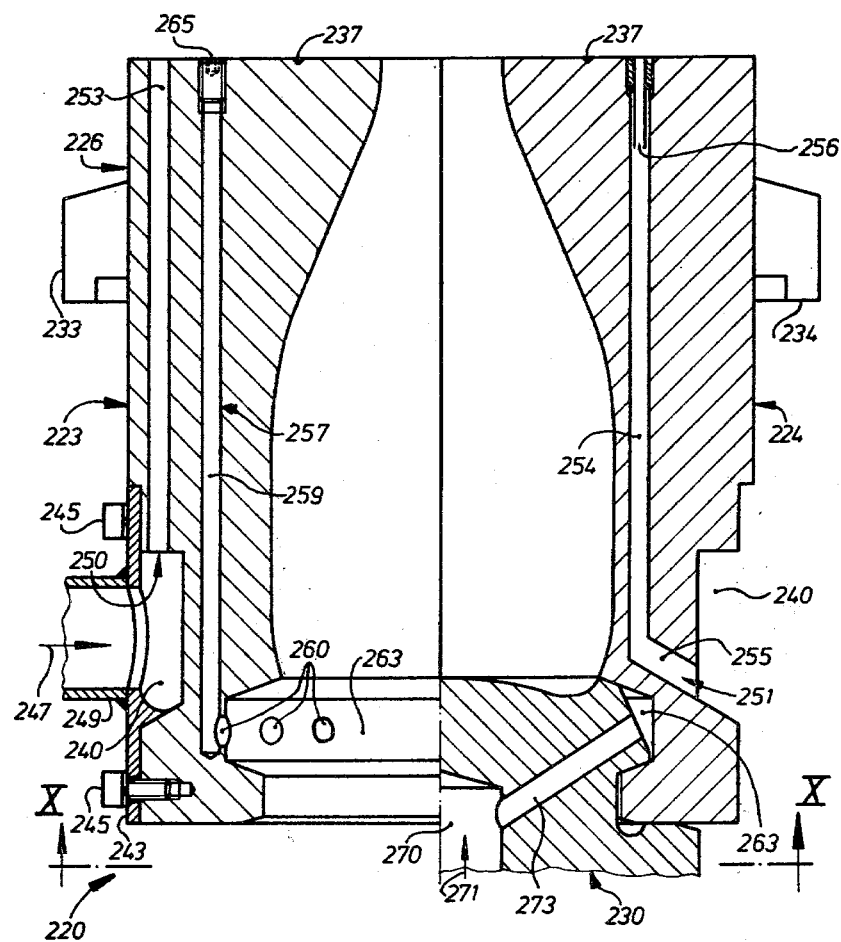
FIG. 11 is a section taken along line XI—XI of FIG. 10, section line X—X of FIG. 11 corresponding to FIG. 10.
Figure 12:
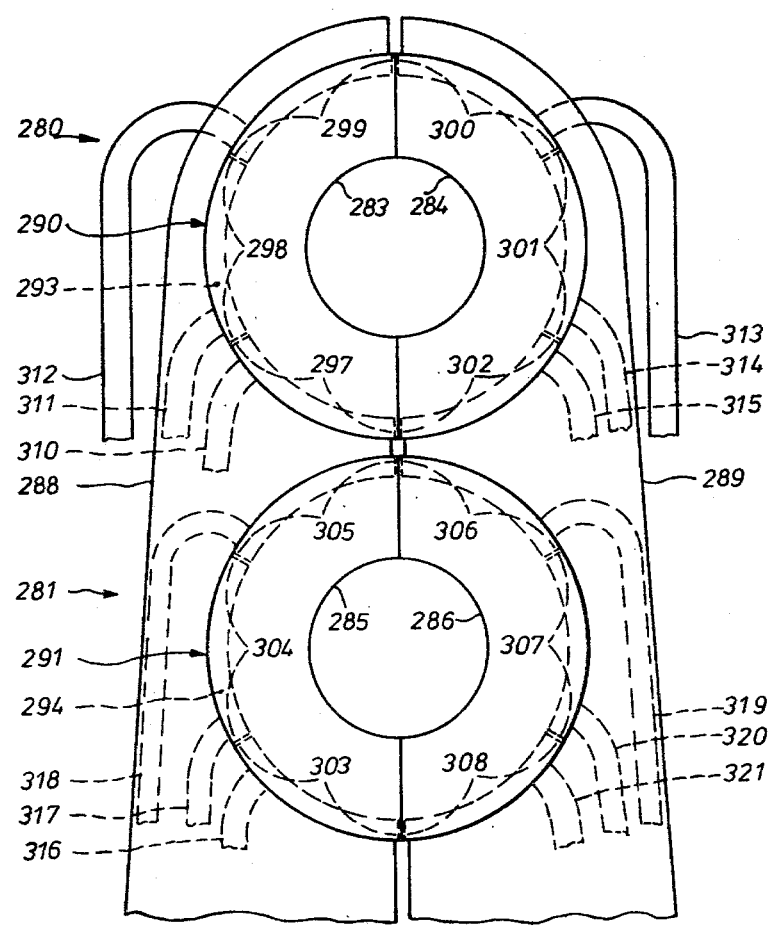
FIG. 12 is a top view of a fifth mold arrangement in accordance with this invention.

FIGS. 10 and 11 show a mold 220 having a pair of finishing mold halves 223 and 224 together forming a wall portion 226, and embracing a mold base part or bottom 230. Projections 223 and 234 on halves 223 and 224 allow the two halves to be mounted in a conventional closing arrangement (not shown) for use with a press-and-blow machine for forming the parison fabricated by the mold arrangements of FIGS. 1-9 into a finished product, near a nere a bottle. A groove 237 at the upper surface of the mold 220 allows a blowing head (not shown) relative to the mold.

At the lower region the center piece halves 223 and 224 are formed with a circumferential outwardly open groove 240 into which fit a plurality of connectors 243 secured by means of screws 245 and connected to conduits 249 to which air is fed as shown by arrow 247. The mold is formed with two arrays 250 and 251 of axially extending passages 253 and 254 which open at their lower ends into the groove 240, the passages 254 having skew connecting passages 255 for this connection. Inserts 256 similar to the inserts 67 and 68 may be provided in the bores.

In addition to the outer array 250 of holes 253 and the inner array of holes 254 there is provided an intermediate array 257 of passages 259 which are connected via short radially extending passages 260 to a groove 263 which receives the upper end of the base 230. To this end base 230 has a central recess 270 to which air is fed as indicated by arrow 271 and which communicates via radial passages 273 to the groove 263 so that air entering as shown by arrow 271 will flow through the passages 273 and 260 to the passages 259 and then out at the top end of the mold into the ambient atmosphere. Plugs as shown at 265 may be provided to fulfill the same function as the plugs 195 of FIG. 7.

With the arrangement of FIGS. 10 and 11 it is therefore possible to control the fluid flow to the various passages in several manners. First of all, the use of the several connectors 243 makes it possible to feed fluid to only one of the bores 253 or 254 if desired, or to an entire group around the sector of the mold. Similarly, the inner passages 259 can also be controlled separately from the passages 253 and 254. The use of the plugs 265 or inserts 256 allows further variation for individual passages, thereby making it possible to achieve the exact thermal relationships desired.

The arrangement of FIG. 2 is a double mold having molds 280 and 281 shown schematically. Each has a pair of center piece halves 283, 284 and 285, 286. The halves 283 and 285 are carried on a mount or tong half 288 and the halves 284 and 286 on a common mount half 289. The halves 283-286 form finishing mold center pieces 290 and 291 which are provided as shown in FIGS. 10 and 11 at their lower ends with passages 293 and 294 into each of which open six respective connectors 297-302 and 303-308 each covering 60 degrees. Each connector 297-308 is provided with a separate feed conduit 310-321 so as to feed a respective group of passages in the mold. It is possible to feed the same fluid to all of the tubes 310-321 or fluids with different heat-exchange characteristics.

Figure 13:
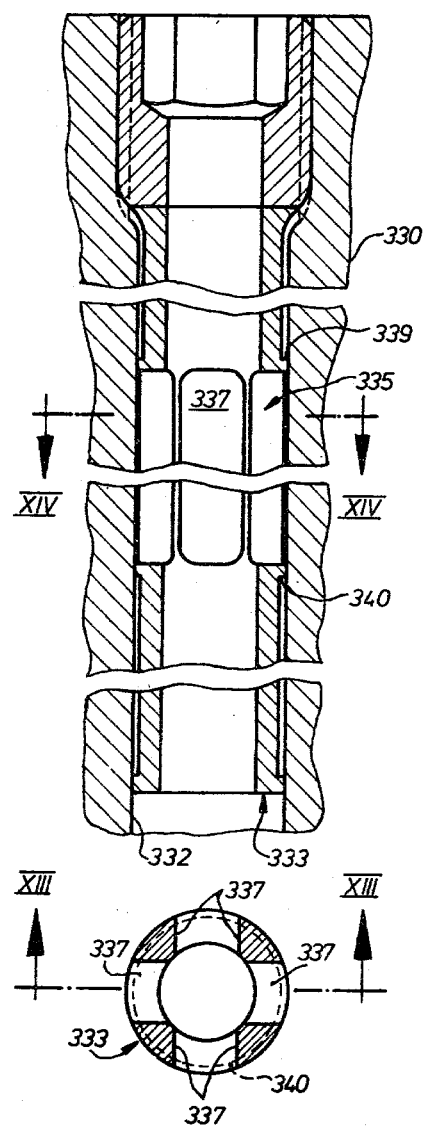
FIG. 13 is a longitudinal section through a detail of the arrangement according to this invention.
Figure 14:
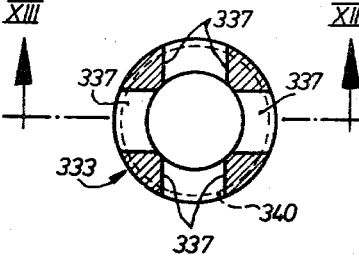
FIG. 14 is a section taken along line XIV—XIV of FIG. 13, section line XIII—XIII of FIG. 14 corresponding to FIG. 13.

FIGS. 13 and 14 show a mold 330 formed with a passage 332 into which is fitted an insert 333 provided at its central region with throughgoing holes 337 to either side of which are formed sealing lips or collars 339 and 340 so that fluid flowing through the tubular insert 333 will be able to contact the inner wall of the passage 332 at the region of these apertures 337. Such an arrangement allows a particular area of the mold to be cooled, whereas the rest of the passage 332 is separated by a small air space from the insert 333 so that heat exchange is low and, therefore, this region will remain relatively hot.

Figure 15:
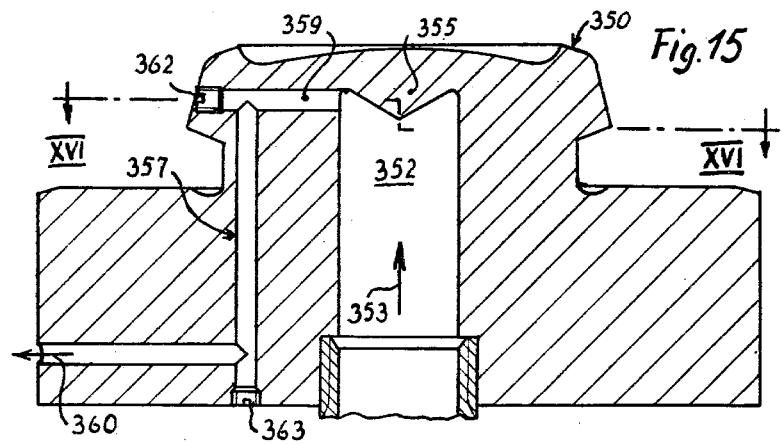
FIG. 15 is a longitudinal section through a mold bottom or base useable in the arrangement of FIG. 10.
Figure 16:
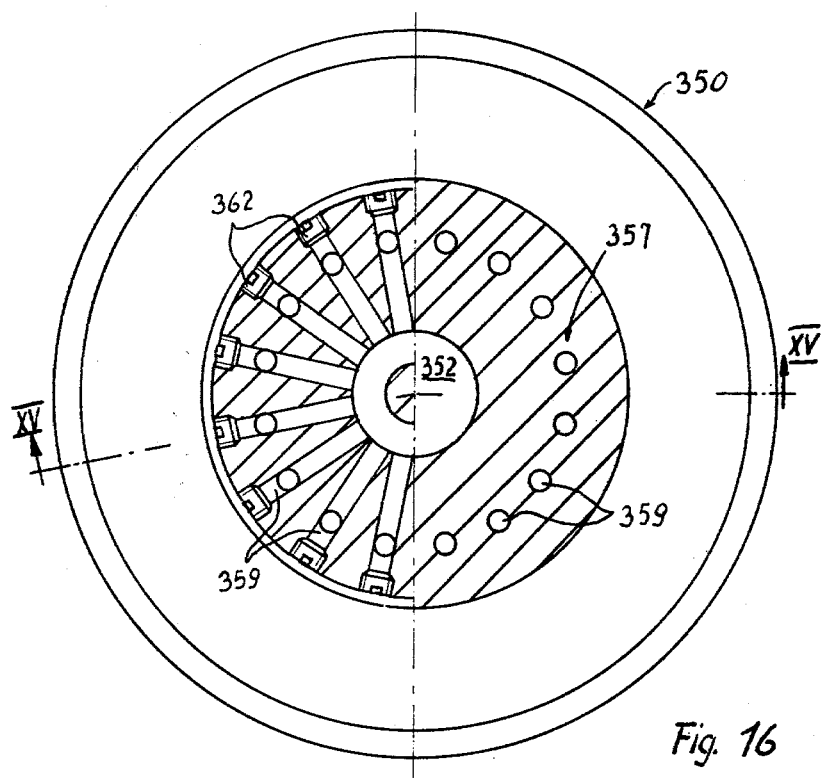
FIG. 16 is a section taken along line XVI—XVI of FIG. 15, section line XV—XV of FIG. 16 corresponding to FIG. 15.

FIGS. 15 and 16 show a mold base 350 which could be used instead of the mold base 230 of FIGS. 10 and 11. This base 350 is formed with a central recess 352 to which a coolant is fed as indicated by arrow 353, being deflected laterally by a conical formation 355 at the upper end of the recess or passage 352. An array 357 of passages 359 each having a central portion extending parallel to the mold axis, an upper portion extending radially thereto and opening into the recess 352, and a lower portion also extending radially but opening outwardly of the base body serve for cooling the mold base 350. Plugs 362 and 363 are provided which are fitted in after machining of the arrangement so that when air is admitted to the recess 352 it will pass outwardly as indicated by arrow 360, thereby cooling the mold base 350.

FIGS. 17 and 18 show another mold base 370 which is generally similar to the mold base 350, identical reference numerals being used for functionally identical structures. In this arrangement, however, connectors 373-379 are screwed to the lower outside of the base 370 and are connected to independent sets 383-389 of passages 390. Fluid is fed to these connectors as for example shown by conduit 393 and arrow 394 in FIG. 17 so that the fluid flows in the opposite direction as in FIGS. 15 and 16, that is radially inwardly, flowing out of the arrangement as indicated by arrow 396. It is also possible as shown in FIG. 18 to provide a large-area hole 400 connected to a separate feed device 403 for particularly cooling a specific region of the mold. Such an arrangement is particularly useful when the mold cavity is of nonround shape, so that a handle portion or the like can be given extra cooling.

FIG. 19 shows a control arrangement useable with embodiment three of FIGS. 7-9. This arrangement basically comprises a plurality of temperature sensors 410-413 in the sectors 211-214. These sensors 410-413 are connected via respective input lines 415-418 to a controller 420 which receives reference signals or set points via inputs 423-426 and produces on lines 430-433 output signals which control pressure-regulating valves 437-440 in feed lines 445-448 extending between a source 450 of pressure fluid and the sectors 211-214.

With this system when, for instance, the temperature in sector 213 exceeds a predetermined maximum the actual value as ascertained by the thermal couple 412 and fed through line 417 to the controller 420 will exceed the set point from line 425 so that the controller 420 will cause the valve 439 to increase the pressure downstream in the line 447. Such an increase in pressure will increase the heat exchange to the fluid flowing through the sector 213 and, therefore lower the temperature therein.

In addition a timer or operating controller 465 for the entire machine serves to extrude the gob, cut the gob off, form the parison, open the various mold portions to move the parison to a finish mold, and so on, is connected via lines 460-463 to shut off valves 453-456 in the lines 445-448. This makes it possible for the flow to any of the sectors to be terminated when desired. Thus, for instance, the cooling of any of the mold sectors can be stopped when the machine is temporarily out of service. This happens, for instance, when a breakdown occurs upstream of the mold. In such a manner it is possible to prevent the arrangement from cooling the mold and the molded article too much, which would have the results of causing the molded article to cool too readily and, perhaps, break.

It will be understood that each of the elements described above, or two or more together, may also find a useful application in other types of system differing from the types described above.

While the invention has been illustrated and described as embodied in a molding arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

1. A mold arrangement for molding thermoplastic materials, comprising an elongated mold including a wall which defines an elongated mold cavity having a longitudinal axis; a plurality of cooling passages each extending lengthwise of said longitudinal axis and each being located over its entire length in various positions in said wall and intersecting a plane extending perpendicular to said longitudinal axis; at least two supply means each feeding at least one stream of cooling fluid through at least one of two different ones of said cooling passages to effect heat exchange between said wall and said cooling fluid; and means for regulating the degree of heat exchange between said wall and the stream of cooling fluid in at least one of said two passages.

2. The arrangement as defined in claim 1, comprising two concentric annuli of said cooling passages.

3. The arrangement as defined in claim 1, wherein said regulating means comprises a removable tubular insert in said at least one passage.

4. The arrangement as defined in claim 1, wherein said regulating means comprises a plurality of tubular inserts in respective ones of said passages.

5. The arrangement as defined in claim 4, where different ones of said tubular inserts have different lengths.

6. The arrangement as defined in claim 1, wherein said regulating means comprises means for varying the rate of flow of cooling fluid through said at least one passage.

7. The arrangement as defined in claim 2, said supply means comprising a pair of concentric feed conduits which each communicate with the passages of one of said two annuli of cooling passages.

8. The arrangement as defined in claim 1, wherein said mold has a plurality of parts which are separable from one another and at least two of which have respective surfaces which engage one another at an interface, at least some of said passages being formed in one of said two parts and having open ends in the surface of said one part and which are closed by the surface of the other of said two parts when said surfaces engage one another at said interface.

9. The arrangement as defined in claim 2, wherein said tubular insert is positioned to prevent fluid moving through the passage from contacting at least a portion of the wall of said at least one passage.

10. The arrangement as defined in claim 3, wherein said tubular insert has spaced ends and is formed between its ends with at least one lateral hole.

11. The arrangement as defined in claim 1, wherein said at least two supply means each comprise a connector secured to said mold and communicating the respective supply means with said at least one passage.

12. The arrangement as defined in claim 1, wherein said mold has two halves which are movable toward and away from one another, and wherein at least some of said passages have parts formed in one and parts formed in the other of said mold halves and positioned so that said parts in the respective halves communicate with one another when said mold halves are moved toward one another until they abut each other.

* * * * *